US012593067B2

(12) United States Patent
Huang et al.

(10) Patent No.: US 12,593,067 B2
(45) Date of Patent: Mar. 31, 2026

(54) PREDICTIVE CODING OF TEXTURE COORDINATES FOR POLYGON MESH COMPRESSION

(71) Applicant: Tencent America LLC, Palo Alto, CA (US)

(72) Inventors: Chao Huang, Palo Alto, CA (US); Thuong Nguyen Canh, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/811,604

(22) Filed: Aug. 21, 2024

(65) Prior Publication Data

US 2025/0071327 A1     Feb. 27, 2025

Related U.S. Application Data

(60) Provisional application No. 63/602,502, filed on Nov. 24, 2023, provisional application No. 63/534,107, filed on Aug. 22, 2023.

(51) Int. Cl.
*H04N 19/597*          (2014.01)
(52) U.S. Cl.
CPC .................................. *H04N 19/597* (2014.11)
(58) Field of Classification Search
None
See application file for complete search history.

(56) References Cited

U.S. PATENT DOCUMENTS

2023/0177736 A1     6/2023 Zhang et al.

OTHER PUBLICATIONS

International Search Report and Written Opinion received in PCT/US2024/043466 mailed on Nov. 13, 2024, 12 pages.
Isenburg et al., "Compressing Polygon Mesh Geometry with Parallelogram Prediction", IEEE Visualization, 2002. VIS, 2002, pp. 141-146.
Isenburg et al., "Compressing Texture Coordinates with Selective Linear Predictions", Proceedings Computer Graphics International 2003, 2003, 6 pages.
Khodakovsky et al., "Near-Optimal Connectivity Encoding of 2-Manifold Polygon Meshes", Graphical Models, 2002, pp. 1-22.

*Primary Examiner* — Christopher Braniff
(74) *Attorney, Agent, or Firm* — ARENTFOX SCHIFF LLP

(57)          ABSTRACT

A method of mesh processing includes receiving coded information of a mesh, the coded information including position connectivity of a plurality of 3D vertices of a mesh in a 3D space, and a correspondence of the plurality of 3D vertices to UV vertices in a UV space for the mesh; determining UV connectivity of the UV vertices; determining, based on the coded information, a first initial UV vertex in a first UV chart in the plurality of UV charts; determining first UV vertices in the first UV chart according to a traversing order of 3D vertices corresponding to the first UV vertices in the first UV chart, the traversing order starting from the first initial UV vertex and traversing each UV vertex in the first UV chart; decoding, from the coded information, prediction residuals of the first UV vertices; and determining first UV coordinates of the first UV vertices accordingly.

20 Claims, 9 Drawing Sheets

700

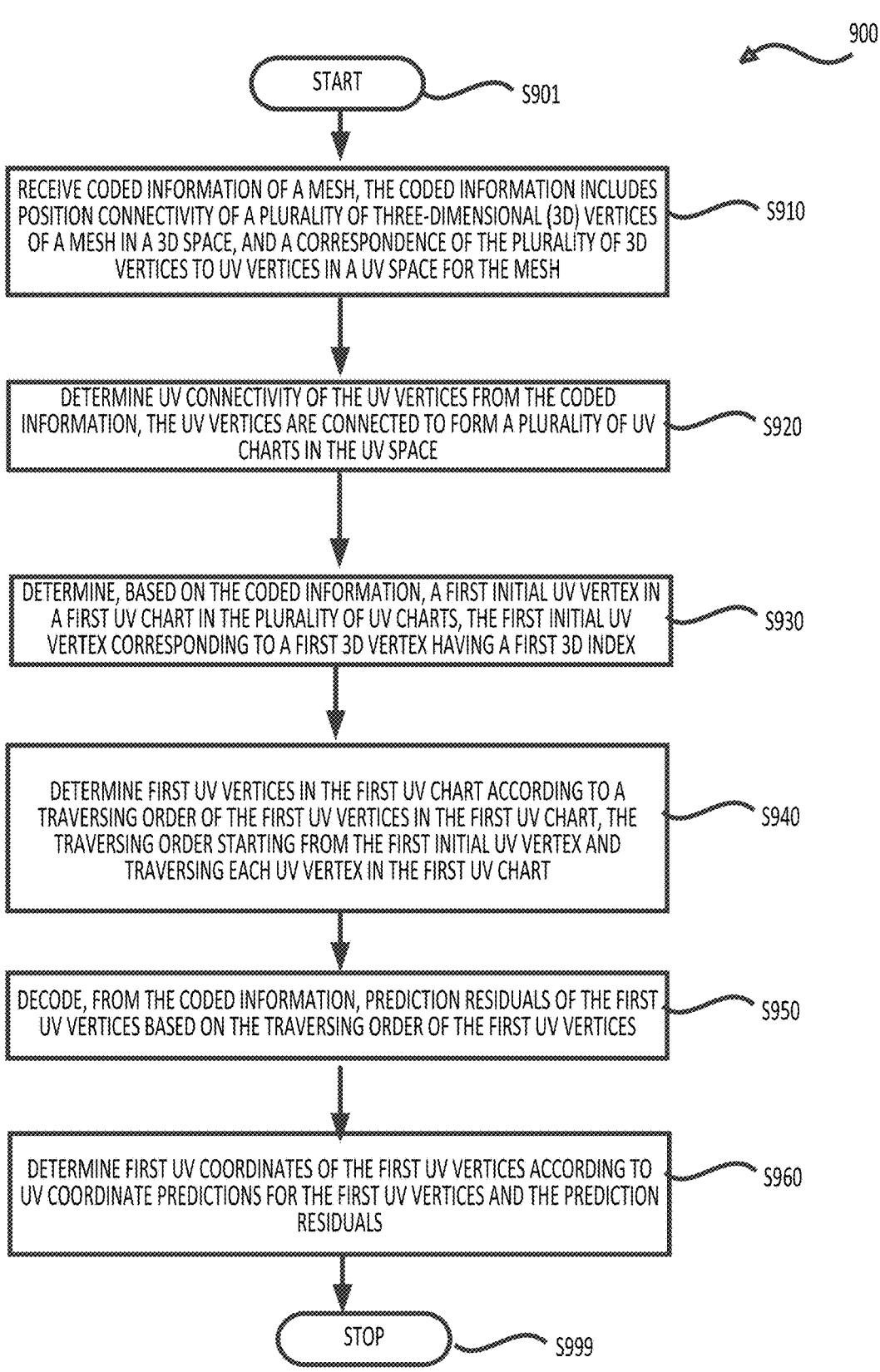
_FIG. 9_

PREDICTIVE CODING OF TEXTURE COORDINATES FOR POLYGON MESH COMPRESSION

INCORPORATION BY REFERENCE

The present application claims the benefit of priority to U.S. Provisional Application No. 63/534,107, "Predictive Coding of Texture Coordinates for Polygon Mesh Compression" filed on Aug. 22, 2023, and U.S. Provisional Application No. 63/602,502, "Improved Texture Coordinate Coding for Polygon Mesh Compression" filed on Nov. 24, 2023, which are incorporated by reference herein in their entirety.

TECHNICAL FIELD

The present disclosure describes aspects generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. For example, technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources. In some examples, 3D meshes can be used as 3D representations of the world.

SUMMARY

Aspects of the disclosure include bitstreams, methods and apparatuses for mesh encoding/decoding. In some examples, an apparatus for mesh encoding/decoding includes processing circuitry.

Some aspects of the disclosure provide a method of mesh processing. The method includes: receiving coded information of a mesh, the coded information including position connectivity of a plurality of three-dimensional (3D) vertices of a mesh in a 3D space, and a correspondence of the plurality of 3D vertices to UV vertices in a UV space for the mesh; determining UV connectivity of the UV vertices from the coded information, the UV vertices being connected to form a plurality of UV charts in the UV space; determining, based on the coded information, a first initial UV vertex in a first UV chart in the plurality of UV charts, the first initial UV vertex corresponding to a first 3D vertex having a first 3D index; determining first UV vertices in the first UV chart according to a traversing order of the first UV vertices in the first UV chart, the traversing order starting from the first initial UV vertex and traversing each UV vertex in the first UV chart; decoding, from the coded information, prediction residuals of the first UV vertices based on the traversing order of the first UV vertices; and determining first UV coordinates of the first UV vertices according to UV coordinate predictions for the first UV vertices and the prediction residuals.

Some aspects of the disclosure also provide a method of mesh processing. The method includes: determining a first initial UV vertex of a first UV chart in a plurality of UV charts in a UV space for a mesh in three-dimensional (3D) space, the mesh including a plurality of 3D vertices in the 3D space that correspond to UV vertices in the UV space; performing UV coordinate predictions for first UV vertices in the first UV chart following a traversing order of the first UV vertices, the traversing order starting from the first initial UV vertex and traversing each UV vertex in the first UV chart; determining prediction residuals of the first UV vertices based on the UV coordinate predictions of the first UV vertices following the traversing order of the first UV vertices; and encoding the prediction residuals of the first UV vertices into a bitstream of coded information of the mesh according to the traversing order.

Some aspects of the disclosure provide a method of processing mesh data, the method includes processing a bitstream of mesh data according to a format rule. The bitstream includes coded information of a mesh, the coded information including position connectivity of a plurality of three-dimensional (3D) vertices of a mesh in a 3D space, and a correspondence of the plurality of 3D vertices to UV vertices in a UV space for the mesh. The format rule specifies that: UV connectivity of the UV vertices is determined from the coded information, the UV vertices being connected according to the UV connectivity to form a plurality of UV charts in the UV space; a first initial UV vertex in a first UV chart in the plurality of UV charts is determined based on the coded information, the first initial UV vertex corresponding to a first 3D vertex having a first 3D index; first UV vertices in the first UV chart are determined according to a traversing order of 3D vertices corresponding to the first UV vertices in the first UV chart, the traversing order starting from the first initial UV vertex and traversing each UV vertex in the first UV chart; prediction residuals of the first UV vertices are decoded from the coded information based on the traversing order of the first UV vertices; and first UV coordinates of the first UV vertices are determined according to UV coordinate predictions for the first UV vertices and the prediction residuals.

Aspects of the disclosure also provide an apparatus for mesh processing. The apparatus for mesh processing including processing circuitry configured to implement any of the described methods for mesh processing.

Aspects of the disclosure also provide a non-transitory computer-readable medium storing instructions which, when executed by a computer, cause the computer to perform any of the described methods for mesh processing.

BRIEF DESCRIPTION OF THE DRAWINGS

Further features, the nature, and various advantages of the disclosed subject matter will be more apparent from the following detailed description and the accompanying drawings in which:

FIG. 9 shows a flow chart outlining a decoding process according to some aspects of the disclosure.

DETAILED DESCRIPTION

Aspects of the disclosure provide techniques in the field of mesh processing.

A mesh (also referred to as mesh model) includes several polygons (also referred to as faces) that describe the surface of a volumetric object. Each polygon can be defined by vertices in three dimensional (3D) space and the information of how the vertices are connected, referred to as connectivity information. In some examples, the mesh also includes vertex attributes, such as colors, normals, displacements, and the like, that are associated with the mesh vertices. Further, in some examples, the mesh can include attributes associated with the surface of the mesh by exploiting mapping information that parameterizes the mesh with two dimensional (2D) attribute maps. Such mapping is usually described by a set of parametric coordinates, referred to as UV coordinates or texture coordinates, associated with the mesh vertices. 2D attribute maps are used to store high resolution attribute information, such as texture, normals, displacements, and the like. The 2D attribute maps can be used for various purposes such as texture mapping, shading and mesh reconstruction and the like.

Figure 1:
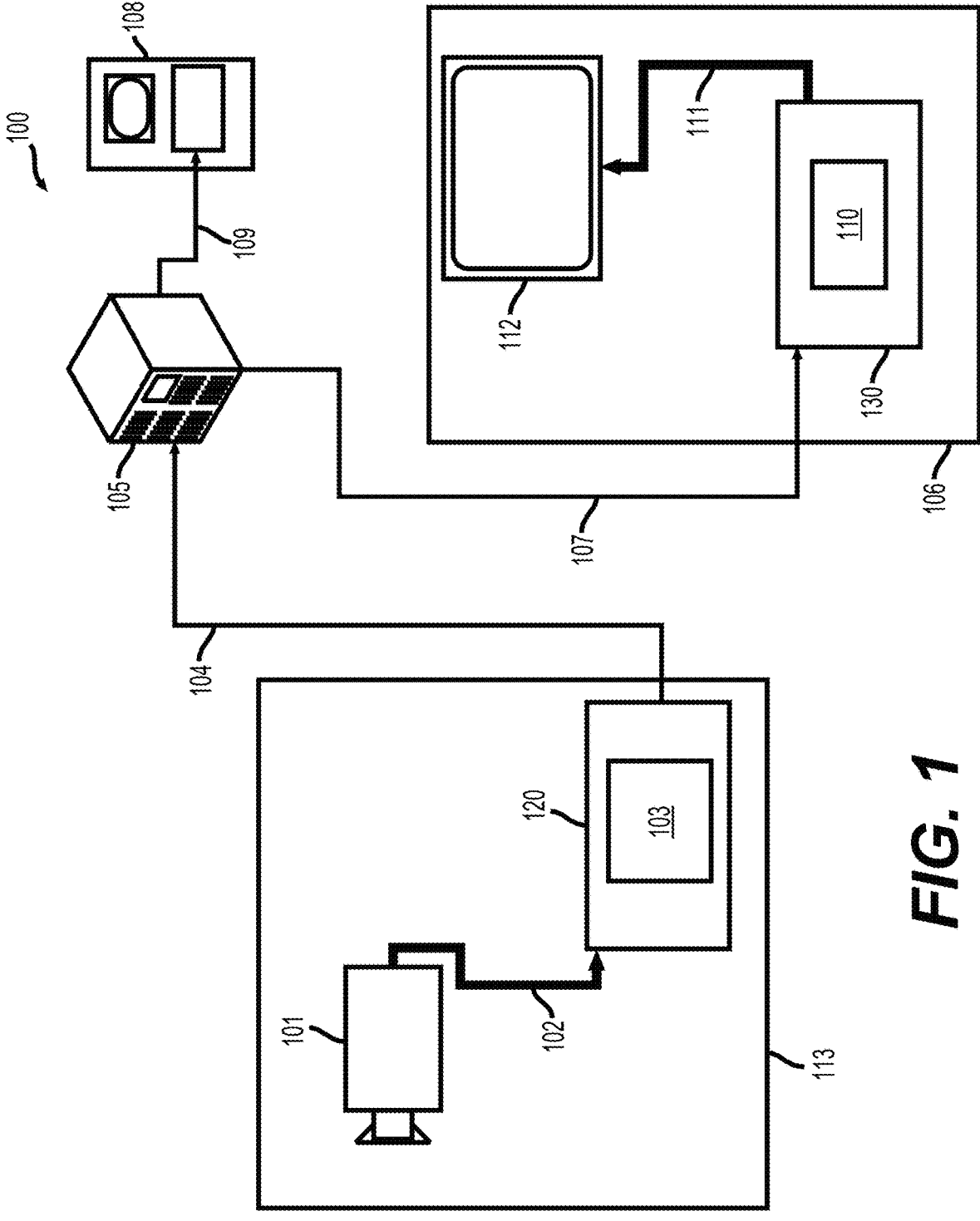
FIG. 1 shows a block diagram of a streaming system in some examples.

FIG. 1 shows a block diagram of a streaming system (100) in some examples. The streaming system (100) is an example of an application for the disclosed subject matter, a mesh encoder and a mesh decoder in a streaming environment. The disclosed subject matter can be equally applicable to other mesh enabled applications, including, for example, conferencing, 3D TV, streaming services, storing of compressed 3D data on digital media including CD, DVD, memory stick and the like, and so on.

The streaming system (100) includes a capture subsystem (113), that can include a 3D source (101), for example light detection and ranging (LIDAR) systems, 3D cameras, 3D scanners, a graphics generation component and the like for creating a stream of 3D data (102) that are uncompressed. In an example, the stream of 3D data (102) includes samples that are taken by the 3D camera system. The stream of 3D data (102), depicted as a bold line to emphasize a high data volume when compared to encoded 3D data (104) (or encoded bitstreams), can be processed by an electronic device (120) that includes a 3D encoder (103) coupled to the 3D source (101). The 3D encoder (103) can include hardware, software, or a combination thereof to enable or implement aspects of the disclosed subject matter as described in more detail below. The encoded 3D data (104) (or encoded bitstream), depicted as a thin line to emphasize the lower data volume when compared to the stream of 3D data (102), can be stored on a streaming server (105) for future use. One or more streaming client subsystems, such as client subsystems (106) and (108) in FIG. 1 can access the streaming server (105) to retrieve copies (107) and (109) of the encoded 3D data (104). A client subsystem (106) can include a 3D decoder (110), for example, in an electronic device (130). The 3D decoder (110) decodes the incoming copy (107) of the encoded 3D data and creates an outgoing stream of 3D representation (111) that can be rendered on a display (112) (e.g., display screen) or other rendering device (not depicted). In some streaming systems, the encoded 3D data (104), (107), and (109) (e.g., video bitstreams) can be encoded according to certain 3D coding/compression standards, such as mesh coding/compression standards and the like.

It is noted that the electronic devices (120) and (130) can include other components (not shown). For example, the electronic device (120) can include a 3D decoder (not shown) and the electronic device (130) can include a 3D encoder (not shown) as well.

It is also noted that, in some examples, the 3D encoders and/or the 3D decoders can use 2D encoding/decoder techniques. For example, the 3D encoder and/or the 3D decoders can include video decoders or video encoders.

Figure 2:
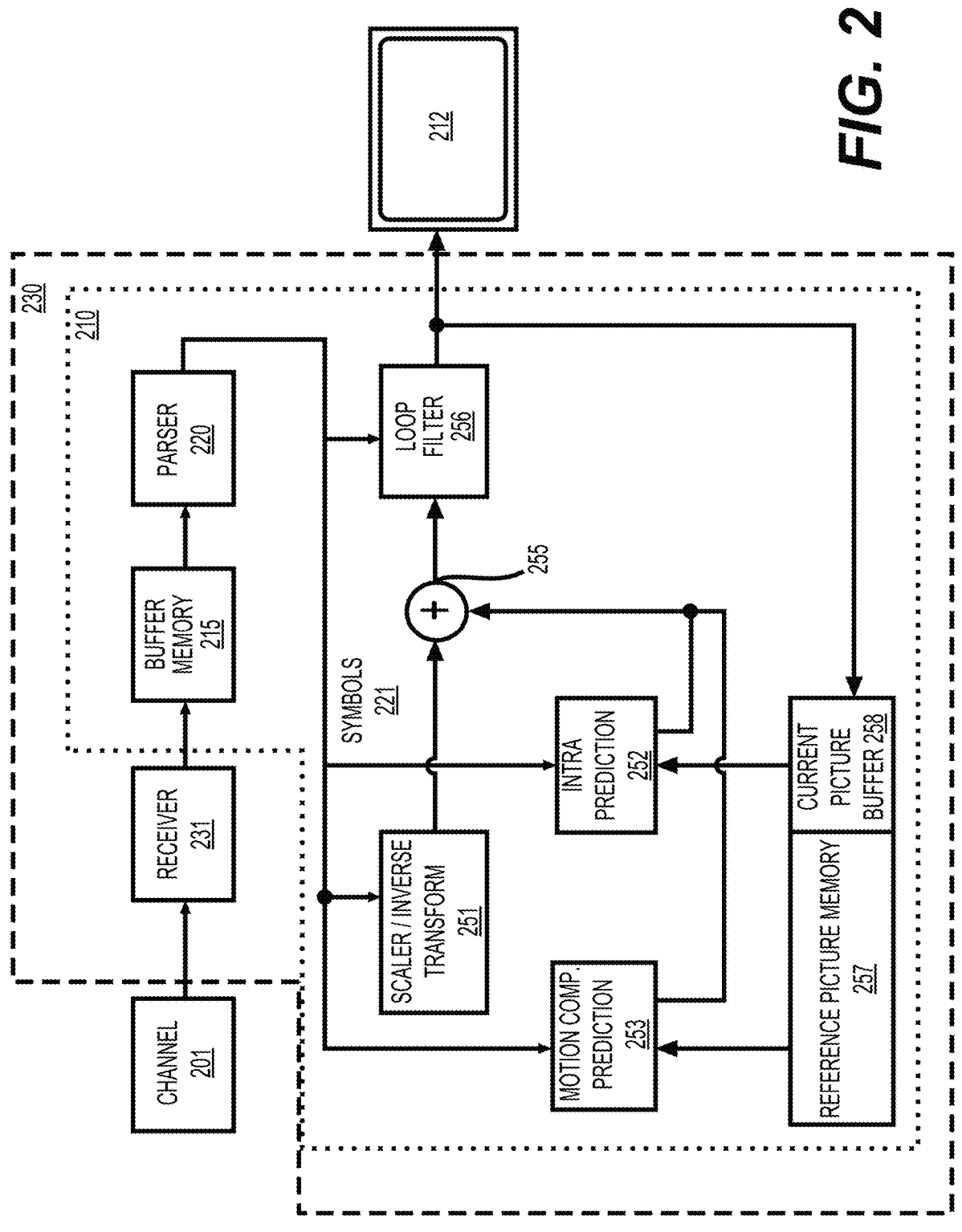
FIG. 2 is a schematic illustration of an example of a block diagram of a video decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the 3D decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
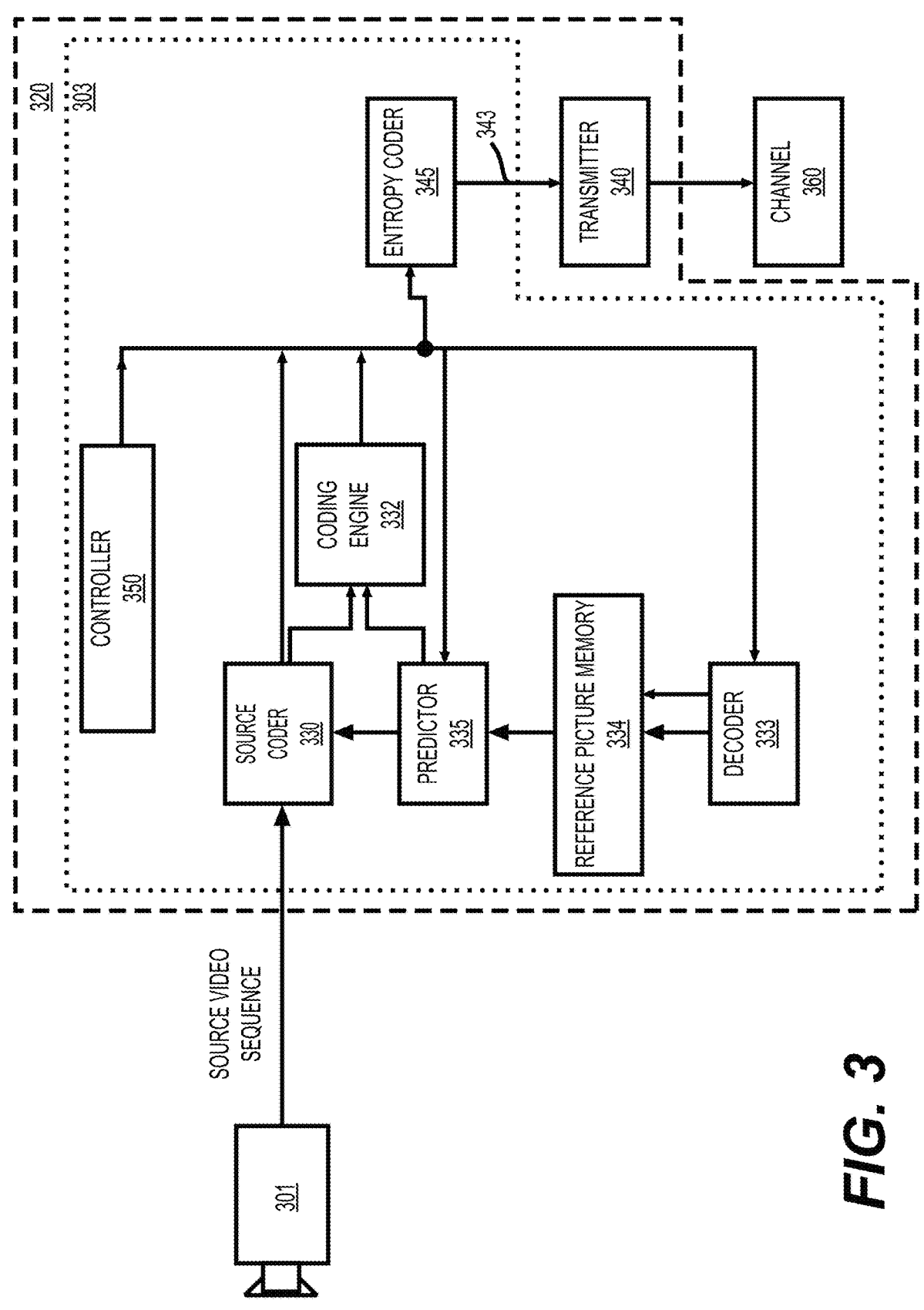
FIG. 3 is a schematic illustration of an example of a block diagram of an video encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the 3D encoder (103) in the FIG. 1 example.

The video encoder (303) may receive video samples from a video source (301) (that is not part of the electronic device (320) in the FIG. 3 example) that may obtain video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the encoders (103) and (303), and the decoders (110) and (210) can be implemented using any suitable technique. In an aspect, the encoders (103) and (303) and the decoders (110) and (210) can be implemented using one or more integrated circuits. In another aspect, the encoders (103) and (303), and the decoders (110) and (210) can be implemented using one or more processors that execute software instructions.

In some examples, the 3D data includes mesh models, and the 3D encoder (103) can include a mesh encoder, and the 3D decoder (110) can include a mesh decoder.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). In some examples, mesh frames in a dynamic mesh can be representations of a surface of an object at different time, and each mesh frame is a representation of the surface of the object at a specific time (also referred to as a time instance). The dynamic mesh may require a large amount of data since the dynamic mesh may include a significant amount of information changing over time. Compression technologies of meshes can allow efficient storage and transmission of media contents in the mesh representation.

A dynamic mesh sequence may require a large amount of data since the dynamic mesh may include a significant amount of information changing over time. Therefore, efficient compression technologies may be used to store and transmit such contents.

Figure 4:
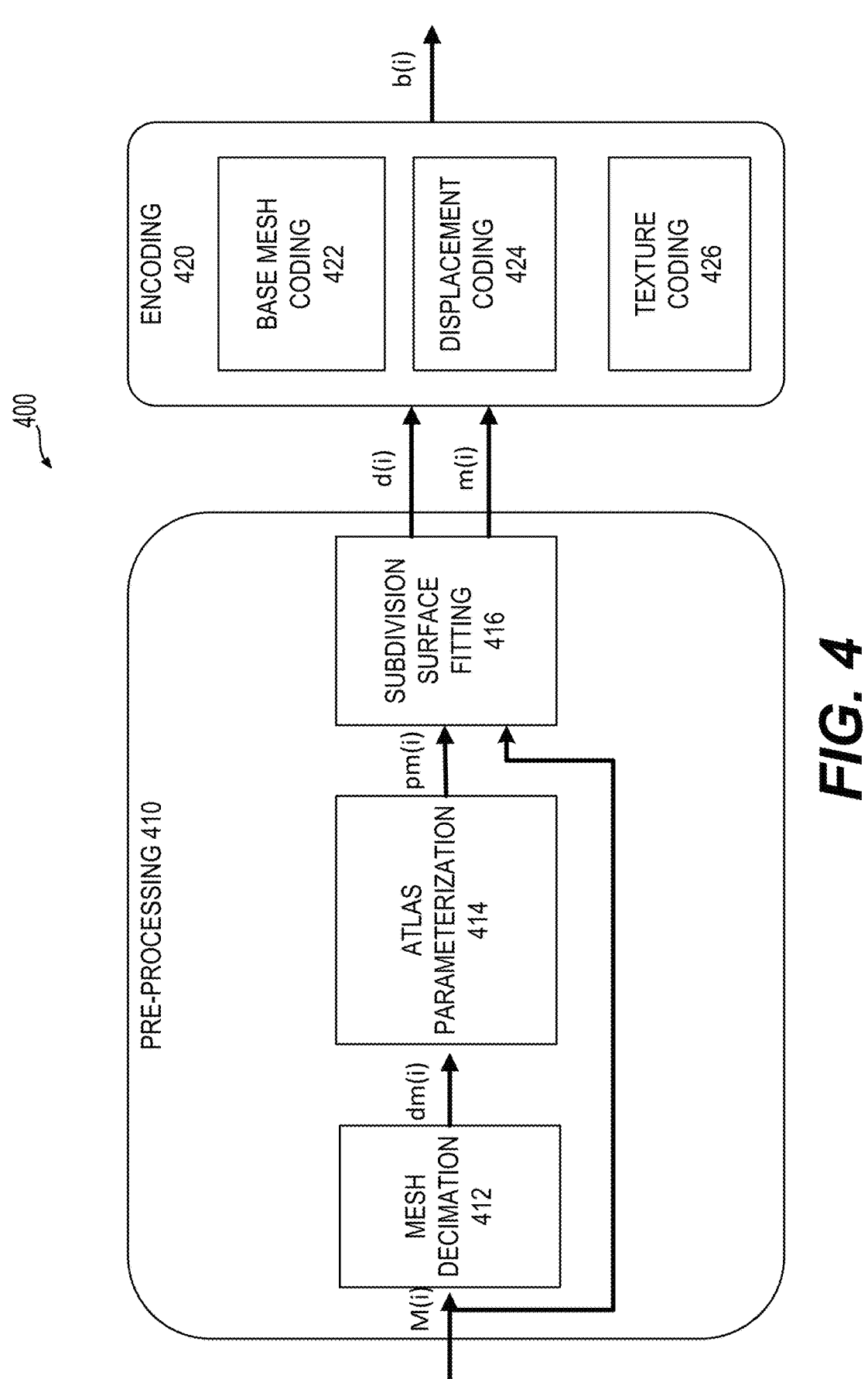
FIG. 4 shows an example of an encoding process (400) for mesh processing according to an aspect of the disclosure.

FIG. 4 shows an example of an encoding process (400) for mesh processing according to an aspect of the disclosure. As shown in FIG. 4, the encoding process (400) includes a pre-processing step (410) and an encoding step (420). The pre-processing step (410) is configured to generate a base mesh m(i) of a current frame and a displacement field d(i) of the current frame that includes displacement vectors according to an input mesh M(i) of the current frame. The encoding step (420) is configured to encode the base mesh m(i), the displacement field d(i), and texture information of the base mesh m(i). The displacement field d(i) of the current frame includes displacement vectors. An index i is used to refer to the current frame. In an aspect, a mode decision method may be performed in the encoding process (400) to determine whether inter coding (also referred to as inter frame prediction or an inter mode), intra coding (also referred to as intra frame prediction or an intra mode), or the like is applied to the current frame. For example, the mode decision method may compare a cost of an intra mode and a cost of an inter mode and decide a coding mode of the base mesh m(i) of the current frame based on which one of the costs is smaller. In some examples, a skip mode is used to code the base mesh m(i). In an example, the skip mode is a special mode of the inter mode. For example, the base mesh m(i) may be intra coded, or inter coded, or coded with the SKIP mode.

Still referring to FIG. 4, the pre-processing step (410) may include a mesh decimation process (412), a parameterization process such as an atlas parameterization process (414), and a subdivision surface fitting process (416). The mesh decimation process (412) is configured to down-sample vertices of the input mesh M(i) to generate a decimated mesh dm(i) that may include a plurality of decimated (or down-sampled) vertices. In an example, a number of the plurality of decimated vertices is less than a number of the vertices of the input mesh M(i). The parameterization process such as the atlas parameterization process (414) is configured to map the decimated mesh dm(i) onto a planar domain, such as onto a UV atlas (or a UV map), to generate a re-parameterized mesh pm(i). In an example, the atlas parameterization may be performed based on a video processing tool, such as a UVAtlas tool. The subdivision surface fitting process (416) is configured to take the re-parameterized mesh pm(i) and the input mesh M(i) as inputs and produce a based mesh m(i) together with the displacement field d(i) that includes the displacement vectors or a set of displacements. In an example of the subdivision surface fitting process (416), pm(i) is subdivided by using a subdivision scheme such as an iterative interpolation to obtain a subdivided mesh. The iterative interpolation includes inserting at each iteration a new point in a middle of each edge of the re-parameterized mesh pm(i). Any suitable subdivision scheme may be applied to subdivide pm(i). The displacement field d(i) is computed by determining a nearest point on a surface of the input mesh M(i) for each vertex of the subdivided mesh.

An advantage of the subdivided mesh may include that the subdivided mesh has a subdivision structure that allows efficient compression, while offering a faithful approximation of the input mesh. An increase in compression efficiency may be obtained due to the following properties. The decimated mesh dm(i) may have a low number of vertices and may be encoded and transmitted using a lower number of bits than the input mesh M(i) or the subdivided mesh. Referring to FIG. 4, the base mesh m(i) may be generated from the decimated mesh dm(i). In an example, the base mesh m(i) is the decimated mesh dm(i). As the subdivided mesh may be generated based on the subdivision method, the subdivided mesh may be automatically generated by the decoder when the base mesh or the decimated mesh is decoded (e.g., there is no need to use any information other than the subdivision scheme and a subdivision iteration count). At the decoder side, the displacement field d(i) may be generated by decoding the displacement vectors associated with the vertices of the subdivided mesh. Besides allowing for spatial/quality scalability, the subdivision structure enables efficient transforms such as wavelet decomposition, which can offer high compression performance.

In the FIG. 4 example, the encoding step (420) includes a base mesh coding (422), a displacement coding (424), a texture coding (426), and the like. The base mesh coding (422) is configured to encode geometric information of the base mesh m(i) associated with the current frame. In an intra encoding, the base mesh m(i) may be first quantized (e.g., using uniform quantization) and then encoded, for example, by the coding mode determined using the mode decision method. The coding mode may be the inter mode, the intra mode, the skip mode, or the like. The encoder used to intra code the base mesh m(i) may be referred to as a static mesh encoder. In the inter encoding, a reference base mesh (e.g., a reconstructed quantized reference base mesh m'(j)) associated with a reference frame indicated by an index j may be used to predict the base mesh m(i) associated with the current frame indicated by the index i. The displacement coding (424) is configured to encode the displacement field d(i) that is generated in the pre-processing step (410). The displacement field d(i) may include a set of displacement vectors (or displacements) associated with the subdivided mesh vertices. The texture coding (426) is configured to encode attribute information of the base mesh m(i). The attribute information may include texture, normal, color, and/or the like. The attribute information may be encoded based on a suitable codec, such as High-Efficiency Video Coding (HEVC) or Versatile Video Coding (VVC).

In an aspect, referring to FIG. 4, a mesh encoding process such as the encoding process (420) starts with a pre-processing (e.g., the pre-processing step (410)). The pre-processing may convert the input mesh (e.g., the input dynamic mesh) M(i) into the base mesh m(i) together with the displacement field d(i) including a set of displacements (or a set of displacement vectors). The encoding step (420) may compress outputs (e.g., m(i), d(i), and the like) from the pre-processing and generate a compressed bitstream b(i). The compressed bitstream b(i) may include a compressed base mesh bitstream, a compressed displacement field bitstream, a compressed attribute bitstream, and/or the like.

Figures 5, 6:
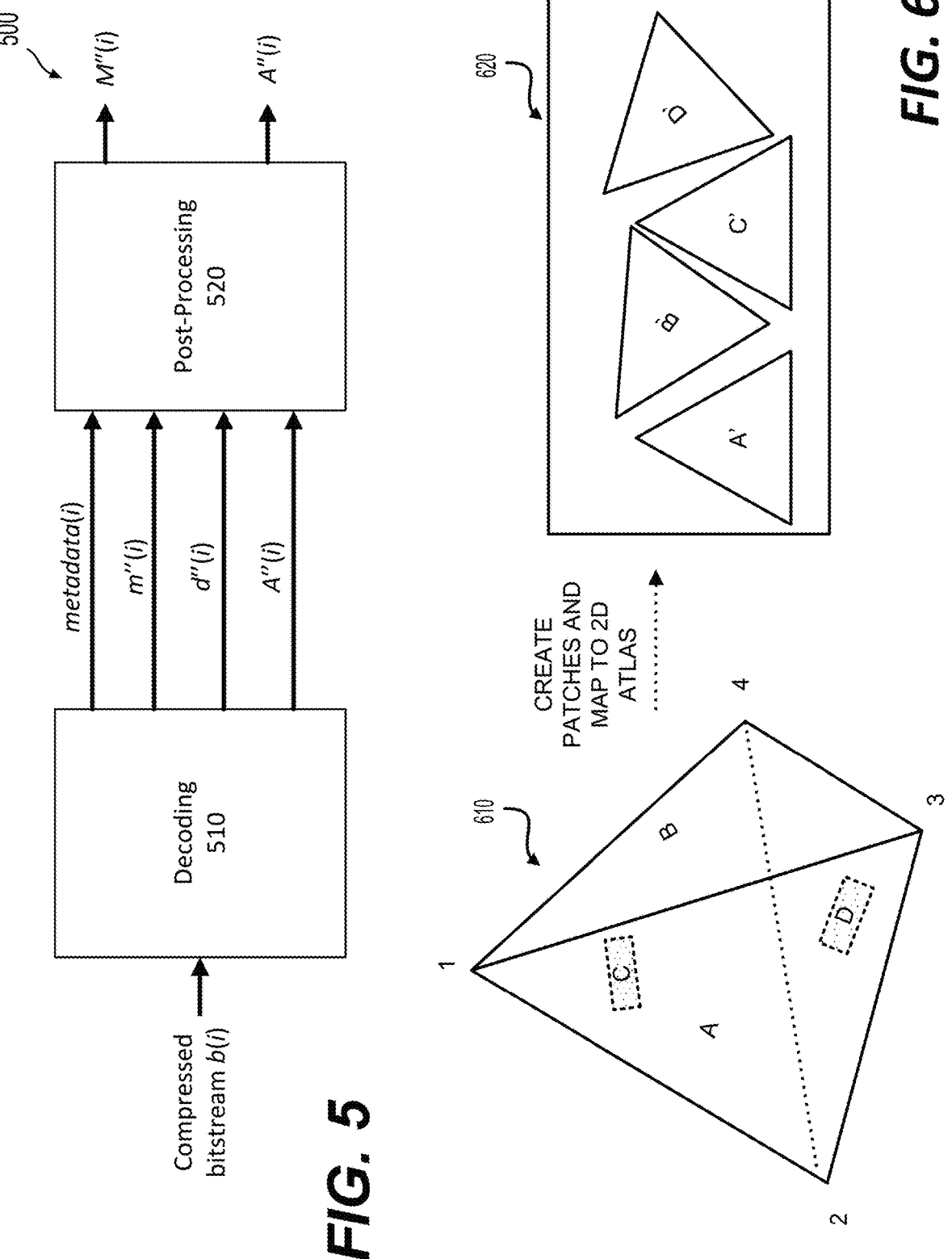
FIG. 5 shows an example of a decoding process (500) for mesh processing according to an aspect of the disclosure.
FIG. 6 shows a diagram illustrating a mapping of a 3D mesh (610) to a 2D atlas (620) in some examples.

FIG. 5 shows an example of a decoding process (500) for mesh processing according to an aspect of the disclosure. The decoding process (500) may include a decoding step (510) and a post-processing step (520). A compressed bitstream b(i) may be fed to the decoding step (510). In an example, such as for a lossless transmission, the compressed bitstream b(i) is the output b(i) from the encoding process (400). The decoding step (510) may extract various sub-bitstreams such as the compressed base mesh sub-stream, the compressed displacement field sub-stream, the compressed attribute sub-stream, and/or the like. The decoding step (510) may decompress the sub-bitstreams to generate the following components: patch metadata indicated by metadata(i), a decoded base mesh m"(i), a decoded displacement field (including displacements) d"(i), a decoded attribute map A"(i), and/or the like.

In an aspect, the base mesh sub-stream may be fed to a mesh decoder to generate a reconstructed quantized base mesh m'(i). The decoded base mesh (or reconstructed base mesh) m"(i) may be obtained by applying an inverse quantization to m'(i). The displacement field sub-stream including packed and quantized wavelet coefficients that are encoded may be decoded by a video and/or image decoder. Image unpacking and inverse quantization may be applied to the packed quantized wavelet coefficients that are reconstructed to obtain the unpacked and unquantized transformed coefficients (e.g., wavelet coefficients). An inverse wavelet transform may be applied to the unpacked and unquantized wavelet coefficients to generate the decoded displacement field (or reconstructed displacement) d"(i).

The decoded components (e.g., including metadata(i), m"(i), d"(i), A"(i), and/or the like) may be fed to a post-processing step (520). A mesh (also referred to as a decoded/reconstructed mesh) M"(i) may be generated by the post-processing step (520) based on m"(i) and d"(i). In an example, the mesh M"(i) (also referred to as a reconstructed deformed mesh DM(i)) may be obtained by subdividing m"(i) using a subdivision scheme and applying the reconstructed displacements d'(i) to vertices of a subdivided mesh. In an example, the DM(i) may include the displaced curve. In an example, when the encoding process (400), the decoding process (500), and the transmission are lossless, the mesh M"(i) may be identical to the input mesh M(i). When one of the encoding process (400), the decoding process (500), and the transmission is lossy, M"(i) is different from M(i). In various examples, the difference, if any, between M"(i) and M(i) may be relatively small. In an example, an attribute map A"(i) is also generated by the post-processing step (520).

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include other information that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is cut into patches (also referred to as patch components) in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

According to an aspect of the disclosure, the patches are parameterized respectively into 2D shapes (also referred to as UV patches, 2D patches, or UV charts) in some examples. The 2D shapes can be packed (e.g., oriented and placed) into a map that is also referred to as UV atlas in some examples. In some examples, the map can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed by representing a mesh using one or more 2D maps (also referred to as 2D atlas in some examples), and then encoding the 2D maps using image or video codecs. Different techniques can be used to generate the 2D maps.

FIG. 6 shows a diagram illustrating a mapping of a 3D mesh (610) to a 2D atlas (620) in some examples. In FIG. 6 example, the 3D mesh (610) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (620) that is also referred to as UV atlas (620) or map (620). For example, the patch A is mapped to a 2D shape (also referred to as UV patch) A' in the map (620), the patch B is mapped to a 2D shape (also referred to as UV patch) B' in the map (620), the patch C is mapped to a 2D shape (also referred to as UV patch) C' in the map (620), and the patch D is mapped to a 2D shape (also referred to as UV patch) D' in the map (620). In some examples, the coordinates in 3D domain are referred to as (x, y, z) coordinates, the coordinates in 2D domain, such as the map (620), are referred to as UV coordinates. A vertex in the 3D mesh can have corresponding UV coordinates in the map (620).

The map (620) can be geometry map with geometry information, or can be texture map with color, normal, textile, or other attribute information, or can be occupancy map with occupancy information.

While each patch is represented by a triangle in the FIG. 6 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 6, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

Figure 7:
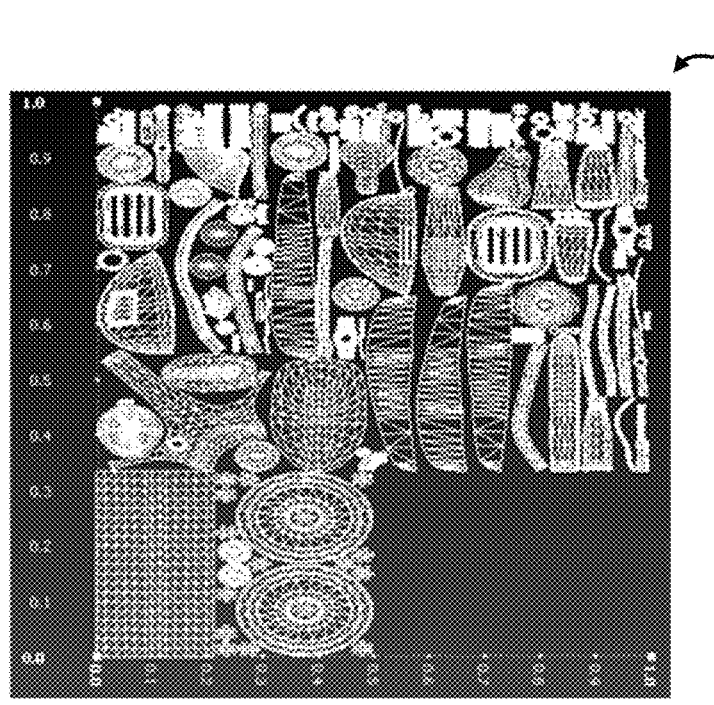
FIG. 7 shows an example of a map (700) of a mesh in some examples.

FIG. 7 shows an example of a map (700) of a mesh in some examples. The map (700) is a UV map (also referred to as UV atlas) that includes texture/UV coordinates and UV connectivity. The map (700) includes a plurality of UV charts that can correspond to patches of a mesh in 3D domain, a UV chart includes UV coordinates of points and connectivity of the points. In some examples, when a mesh includes UV charts, such as shown by FIG. 7, the mesh codec needs to encode the UV coordinates and the corresponding connectivity (referred to as UV connectivity hereafter) of the UV charts.

Various techniques are developed to encode the UV coordinates. In some examples, when the UV coordinates are coded after the coding of 3D positions and 3D connectivity, the 3D positions and the 3D connectivity can be used to predictively encode UV coordinates. For example, a technique that is referred to as stretch prediction technique can compress UV coordinates (also referred to as texture coordinates). The stretch prediction technique can predict, based on 3D positions of three 3D vertices and UV positions of two of the three UV vertices corresponding to the three 3D vertices, the coordinate of the third UV vertex. According to an aspect of the disclosure, the stretch prediction technique may not be efficient at coding UV coordinates because, during the traversal of vertices and polygons, the coding process may leave a UV chart before encoding all UV coordinates of the UV chart and when the coding process comes back to the UV chart, the coding process may need to re-initialize the prediction of the UV coordinates in the UV chart.

Some aspects of the present disclosure provide techniques to predictively encode the UV/texture coordinates for polygon mesh compression with higher efficiency. The techniques can be applied individually or by any form of combinations.

In some aspects, after the UV connectivity is encoded/decoded, the UV coordinates can be encoded/decoded based on the UV connectivity. In an example, the UV coordinates are encoded based on the UV connectivity in a similar manner as encoding the 3D positions based on the position connectivity. Further, according to an aspect of the disclosure, during the encoding process, all UV coordinates in a specific UV chart are encoded before moving to encode other charts, thus there is no need to re-initialize the prediction of the UV coordinates in the specific UV chart. In some examples, encoder/decoder can determine a first initial UV vertex in a first UV chart and determine first UV vertices in the first UV chart following a traversing order of the first UV vertices in the first UV chart, the traversing order starts from the first initial UV vertex and traverses each UV vertex in the first UV chart. Then, the first UV vertices can be coded (encoded/decoded) following the traversing order before moving to a next UV chart.

According to a first aspect of the disclosure, some techniques are provided to make sure that both encoder and decoder know, for each encoded/decoded UV vertex, which 3D vertex the UV vertex corresponds to. For example, some techniques can establish the correspondence between 3D vertices and UV vertices. In some examples, a first approach includes signaling for indicating a correspondence of an initial vertex in an UV chart to a 3D vertex. In some examples, a second approach that does not rely on signaling to indicate the correspondence can be used.

In some embodiments, the indices or index offsets of the initial face and initial vertex in each UV chart are signaled. According to an aspect of the disclosure, UV connectivity of UV vertices within each UV chart is consistent with the position connectivity of corresponding positions (for 3D vertices) in the 3D space. When a correspondence of the initial face and initial vertex in a UV chart to a 3D face and a 3D vertex is known, the correspondence (e.g., indices correspondence) of the remaining faces and vertices in the UV chart to the 3D faces and 3D vertices in the 3D space can be determined for example based on the UV connectivity and the position connectivity, thus in an example, no need to signal the correspondence for the remaining faces and vertices in each UV chart.

In some examples, the indices of the initial face and the initial vertex in a first UV chart are signaled. In an example, the encoder identifies the initial vertex of the first UV chart to be the one that is closest to the origin or the center of the UV space in terms of L1/L2 norm of the UV coordinates. Then, one of the incident faces to the initial vertex in the UV space is identified as the initial face by the encoder. In an example, the encoder can signal the index of the 3D vertex corresponding to the initial vertex of the first UV chart and the index of the face in the 3D space corresponding to the initial face in the UV space. Thus, the encoder and the decoder can establish correspondence of 3D vertices and UV vertices for the first UV chart.

Further, in some examples, the initial vertices and faces of other UV charts (other than the first UV chart in the encoding process) can be determined by finding the one closest to reference vertices in the UV space, and the index offsets of the corresponding 3D vertices and faces to the 3D indices of the reference vertices can be signaled. The reference vertex can be the last vertex or the first vertex in the previous UV chart, or any other choice. For example, for the second UV chart in the encoding process, the initial vertex (e.g., initial UV vertex) of the second UV chart can be determined to be the one that is closest to a reference vertex, such as the last UV vertex in the first UV chart. Then, an index offset of the corresponding 3D vertex of the initial vertex of the second UV chart to the corresponding 3D vertex of the last vertex in the first UV chart can be signaled.

In some examples, the initial vertices and faces of the other UV charts can be determined based on a plurality of top n vertices (UV vertices) that are closest to the reference vertex, n is a positive integer that is greater than 1. For example, the top n UV vertices that are closest to the reference vertex are searched, and the one with the optimal balance between small vertex/face index offset and minimum distance to the reference vertex is chosen as the initial vertex/face. In this way, the prediction errors of the initial UV coordinates in each chart can be minimized at the cost of signaling indices of 3D vertices and faces. For example, when a UV vertex can achieve the optimal balance between small vertex/face index offset and minimum distance to the reference vertex, and the signaling for the UV coordinate of the UV vertex includes vertex/face index offset (e.g., for indicating the corresponding 3D vertex of the UV vertex according to the 3D vertex of the reference vertex) and a distance of the UV vertex to the reference vertex (e.g., for signaling the UV coordinate of the UV vertex) can have small cost.

In some embodiments, the indices of 3D vertices/faces corresponding to the initial UV vertices/faces in each chart are not signaled, and the initial UV vertices/faces in each chart can be determined according to some predefined rules. In some examples, after encoding the UV coordinates in a UV chart, the first unvisited (e.g., not encoded/decoded) vertex/face with the smallest index number in 3D vertices is chosen as the initial vertex/face of a next UV chart. For example, after encoding the UV coordinates in a UV chart, from the unvisited 3D vertices, the 3D vertex with the smallest index number is selected as the corresponding 3D vertex of the initial UV vertex of the next UV chart.

In some examples, after encoding the UV coordinates in a UV chart, the first n unvisited vertices/faces are searched (n is positive integer that is larger than 1), the one with minimum distance to a reference vertex is chosen (e.g., by the encoder) as the initial vertex/face of a next chart, n is a positive integer that is larger than 1. The encoder can signal which one of the first n unvisited vertices/faces is chosen. In an example, the reference vertex is the last visited UV vertex in the UV chart. In another example, the reference vertex is defined as the center of the UV space. In this way, the cost signaling initial vertex/face indices can be significantly reduced depending on the value of n. In an example, the signaling of the UV coordinates for the UV vertex that includes a first signaling of one in the first n unvisited vertices and a second signaling of a distance of the UV vertex to the reference vertex can have small cost.

In some embodiments, the indices of 3D vertices and faces corresponding to the initial UV vertices and faces in each chart are not signaled. Instead, at the encoder side, the initial vertices/faces of UV charts are categorized into two types that are referred to as a first type and a second type. The first type of the initial vertices/faces includes the ones of the connected components of the 3D meshes (named submeshes hereafter) that are the first unvisited 3D vertex/face with the smallest index number. The second type are the initial vertices/faces of UV charts but not the initial vertices/faces of the submeshes. For the first type, the initial vertices/faces can be determined by finding the first unvisited 3D vertex/face (e.g., the first unvisited vertex/face with the smallest index number in 3D vertices), and center of the UV space can be used to predict the UV coordinates of the initial vertices/faces (e.g., a distance of the UV coordinate to the center of the UV space can be encoded to indicate the UV coordinate).

In some examples, the 3D vertices are all visited (e.g., each having at least one encoded/decoded UV vertex), but there are unvisited UV vertices, thus the second type initial vertices/faces can be used to continue the encoding process.

In some examples, at the encoder side, for the second type of the initial vertices/faces, the visited UV vertices corresponding to seam vertices are recorded, a seam vertex is defined as a 3D vertex with multiple corresponding UV vertices. For each of the visited UV vertices (named seam UV vertices hereafter), all other seam UV vertices corresponding to the same 3D seam vertex (named seam vertex mates) are searched by the encoder to find a pair of seam vertex mates that are closest in the UV space, one UV vertex in the pair of seam vertex mates is visited and the other UV vertex in the pair of seam vertex mates is unvisited. Then, the unvisited seam UV vertex is chosen by the encoder as the initial vertex of the next UV chart, and the coordinate of the visited UV vertex in the pair of seam vertex mates can be used to predict the coordinate of the unvisited UV vertex in the pair of seam vertex mates.

In some examples, in the record of visited UV vertices corresponding to seam vertices, the first seam UV vertex with unvisited seam vertex mates is chosen (e.g., by the encoder) to determine a pair of seam UV vertex mates with minimum distance among all seam vertex mates of the first seam UV vertex. In some examples, the encoder can determine, among all pairs of seam vertex mates, a pair of seam vertex mate with the global minimum distance, and can signal the index offset of the seam UV vertex that is unvisited in the pair of seam vertex mate. In some examples, for the decoder to know which seam UV vertex is chosen as the initial vertex and which is chosen as the reference vertex, the index offset of the initial vertex selected from the unvisited ones (when there are multiple unvisited ones) and the index offset of the reference vertex selected from the visited ones (when there are multiple visited ones) are signaled. In this way, signaling indices of 3D vertices and faces corresponding to initial vertices/faces at the cost of larger prediction residuals of the UV coordinates of the initial vertices/faces of UV charts can be avoided.

Figure 8:
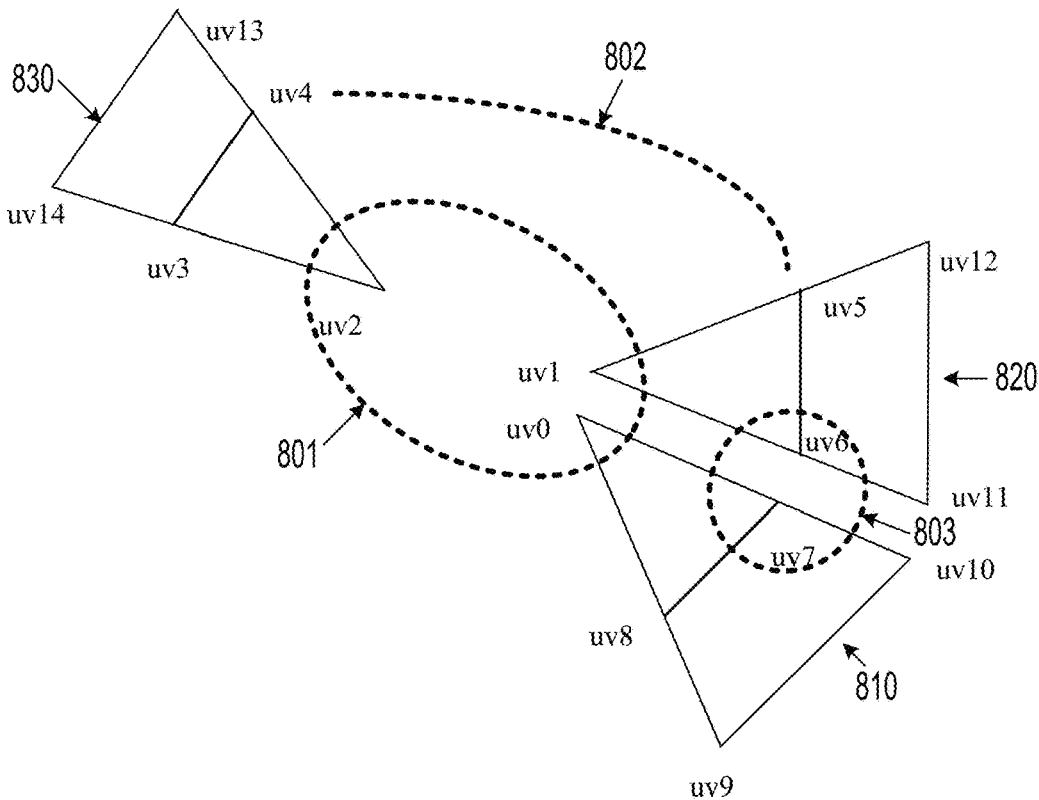
FIG. 8 shows a diagram of selecting the second type of the initial vertex in some examples.

FIG. 8 shows a diagram of selecting the second type of the initial vertex in some examples. In the FIG. 8 example, a UV map (800) includes UV charts (810), (820) and (830). In the UV map (800), seam UV vertices "uv0", "uv1" and "uv2" correspond to a same 3D seam vertex (801), and are seam vertex mates. The seam UV vertices "uv4" and "uv5" correspond to a 3D seam vertex (802) and are seam vertex mates. The seam UV vertices "uv6" and "uv7" correspond to a 3D seam vertex (803) and are seam vertex mates. In an example, when only the UV chart (810) has been visited, then among all pairs of visited and unvisited seam vertex mates, the distance between "uv0" and "uv1" is minimum, so UV vertex "uv1" is chosen as the initial vertex of a next UV chart and UV vertex "uv0" is chosen as the reference vertex.

In some embodiments, whether to use the first approach that signals the initial vertices/faces of UV charts or use the second approach that does not signal the initial vertices/faces of UV charts can be adaptively determined. In some examples, when the numbers of vertices or faces are much larger than the maximum quantized UV coordinates, then signaling the indices of 3D vertices/faces could be costly, thus the second approach can be employed.

According to an aspect of the disclosure, after determining the initial vertex/face in a UV chart, the correspondence between 3D vertices and UV vertices in the UV chart can be established. Then, the UV coordinates of the vertices in the UV chart can be predictively encoded based on the connectivity. In an example, the coordinate of the initial vertex (initial UV vertex) can be predicted by the coordinate of the reference vertex (reference UV vertex), the coordinate of a second vertex in the initial face of the UV chart can be coded by delta coding using the coordinate of the initial vertex. The coordinate of the third vertex in the initial face can be coded by the stretch prediction. The stretch prediction can, based on 3D positions of three 3D vertices and UV positions of two of the three UV vertices corresponding to the three 3D vertices to predict the coordinate of the third UV vertex. For example, based on 3D positions of a first 3D vertex corresponding to the initial UV vertex, a second 3D vertex corresponding to the second UV vertex, a third 3D vertex corresponding to the third UV vertex and UV coordinates of the initial UV vertex and the second UV vertex, the stretch prediction can predict the coordinate of the third UV vertex. For the rest of the vertices of the initial face, their coordinates can be encoded by using within-parallelogram prediction. For vertices in other faces in the UV chart, a traversal order can be suitable determined using any suitable technique, so vertices in other faces can have as many nearby visited vertices as possible to predict their coordinates. In some examples, when a face has one visited vertex, then the coordinate of the first unvisited vertex in that face can be coding using delta coding. When a face has two visited vertices in the face, then the coordinate of the first unvisited vertex can be coded by either stretch coding, or by across-parallelogram prediction. When a face has more than two visited vertices, then the coordinates of the unvisited vertices in that face can be coded by using within-parallelogram prediction. In some examples, other suitable techniques, such as multi-stretch or multi-parallelogram predictions can also be used when available.

In some examples, when using arithmetic coding to encode prediction residuals, coding context can be adaptively chosen based on the prediction scheme. For example, different contexts can be used for the first type of initial vertices, the second type of initial vertices, the second vertex in a chart, vertices coded by stretch predicted, within parallelogram prediction and across parallelogram prediction.

Some aspects of the disclosure also provide techniques to code the UV coordinates in some special cases. In some examples, the number of vertices in the UV space can equal to the total face degree, which is the sum of the number of vertices incident to each face, which means all the faces in the UV space are disconnected. In this case, no across-parallelogram prediction schemes can be applied to predict UV coordinates. However, in some examples, certain UV vertices are likely to have the same UV coordinates, and then the UV coordinates of the UV vertices having the same UV coordinates can be efficiently coded.

In some examples, UV vertices correspond to the same 3D vertex can be placed in a group that is referred to as a seam UV vertex group, all of the UV vertices or some of the UV vertices in the seam UV vertex group are likely to have the same UV coordinates, although they are distinct UV vertices. In some examples, the UV coordinates in the case of all disconnected faces can be efficiently encoded for example by a process of following seven steps.

In a first step, the UV vertices in the same seam UV vertex group are organized in the clockwise or counterclockwise order.

In a second step, when a UV vertex is coded, the UV vertex is checked to determine whether the UV vertex belongs to a seam UV vertex group. In an example, the UV vertex is checked to determine whether there are other UV vertices corresponding to the same 3D vertex. When there are other UV vertices corresponding to the same 3D vertex as the UV vertex, the UV vertex is pushed into a queue, such as a queue referred to as seam VertQueue.

In a third step, at a time to find an initial UV vertex to encode remaining UV vertices and faces, seam VertQueue is checked first.

In the third step, in some first examples, when the top vertex in the seam VertQueue has one or more unvisited (e.g., not encoded) UV vertices in the same seam UV vertex group, then the first unvisited UV vertex (e.g. starting from the top vertex and according to the organized order in the first step) in the seam UV vertex group can be chosen as the initial UV vertex and the visited vertex immediately preceding the initial vertex in the seam UV vertex group (e.g., according to the organized order in the first step) can be chosen as the reference vertex.

In the third step, in some second examples, when the top vertex in seam VertQueue has no unvisited UV vertex in the seam UV vertex group, the top vertex is popped out of the seam VertQueue, and the next top vertex in seam VertQueue can be checked. When the seam VertQueue is empty and the initial UV vertex hasn't been found, whether there are unvisited UV vertices can be checked.

In the third step, in some third examples, when there are (is) unvisited UV vertices (vertex), one of the unvisited UV vertices (e.g., the first one) can be chosen as the initial UV vertex; when there is no unvisited UV vertex, all UV vertices have been coded. In some examples, the reference vertex can be chosen as the previous coded UV vertex or using a fixed point in the UV space (e.g., the origin or the center of the UV space) as the reference vertex.

In a fourth step, to encode the coordinate of the initial UV vertex, the coordinate of the reference vertex is used to predict the coordinate of the initial UV vertex, then the prediction residuals can be encoded via entropy coding.

In a fifth step, the coordinate of the second UV vertex in the initial face is encoded. In some examples, when the initial UV vertex is determined in the way described in the third step of the third examples, the coordinate of the initial UV vertex is used to predict the coordinate of the second UV vertex, and then the prediction residuals can be coded.

In the fifth step, when the initial UV vertex is determined in the way described in the third step of the first examples, the face that is incident to the reference vertex (referred to as the reference face) is determined, then the coordinate of a UV vertex preceding the reference vertex in the reference face is used to predict the coordinate of the second vertex in the initial face.

In a sixth step, the coordinate of a third UV vertex in the initial face can be coded by a stretch prediction, and coordinates of the remaining vertices in the initial face, if any, can be coded by within-parallelogram predictions.

In a seventh step, after coding all the vertices in the initial face, iterations can be performed based on the UV vertices in the same seam UV vertex group as the initial UV vertex, each iteration can select one of the UV vertices in the same seam UV vertex group as the starting point in the iteration.

In some examples, when a UV vertex in the seam UV vertex group has already been visited, the iteration starting from the UV vertex is skipped. Otherwise, when the seam UV vertex group has an unvisited UV vertex, the coordinate of the unvisited UV vertex in the seam UV vertex group (called the current seam vertex) is predicted by the coordinate of the preceding UV vertex in the seam UV vertex group. The unvisited UV vertex is referred to as a current seam vertex.

In some examples, a face that is incident to the current seam vertex is determined and the face is referred to as the current face. Then, a second vertex incident to the current face is coded. In an example, the current seam vertex has the same UV coordinate as the preceding UV vertex in the seam UV vertex group, then the coordinate of the vertex preceding the preceding vertex in the preceding face is used to predict the coordinate of the second vertex in the current face. In another example, a distance between the UV coordinates of the current seam vertex and the preceding UV vertex (of the current seam vertex) in the seam UV vertex group is smaller than a specified threshold, then the coordinate of the vertex preceding the preceding vertex in the preceding face is used to predict the coordinate of the second vertex in the current face.

In another example, the current seam vertex has a different UV coordinate from the preceding vertex in the group, the coordinate of the current seam vertex is used to predict the coordinate of the second vertex in the current face. In another example, the distance between the UV coordinates of the current seam vertex and the preceding UV vertex (of the current seam vertex) in the seam UV vertex group is larger than a specified threshold, the coordinate of the current seam vertex is used to predict the coordinate of the second vertex in the current face.

It is noted that, in the seventh step, the coordinates of remaining vertices incident to the current face can be coded in the same way as in the sixth step.

FIG. 9 shows a flow chart outlining a process (900) according to an aspect of the disclosure. The process (900) can be used in a mesh decoder. In various aspects, the process (900) is executed by processing circuitry, such as the processing circuitry that performs functions of the 3D decoder (110), and the like. In some aspects, the process (900) is implemented in software instructions, thus when the processing circuitry executes the software instructions, the processing circuitry performs the process (900). The process starts at (S901) and proceeds to (S910).

At (S910), coded information of a mesh is received. The coded information includes position connectivity of a plurality of three-dimensional (3D) vertices of a mesh in a 3D space, and a correspondence of the plurality of 3D vertices to UV vertices in a UV space for the mesh.

At (S920), UV connectivity of the UV vertices is determined, the UV vertices are connected to form a plurality of UV charts in the UV space.

At (S930), a first initial UV vertex in a first UV chart in the plurality of UV charts is determined, the first initial UV vertex corresponds to a first 3D vertex having a first 3D index.

At (S940), first UV vertices in the first UV chart are determined according to a traversing order for the first UV vertices. The traversing order starts from the first initial UV vertex and traverses each UV vertex in the first UV chart. In some examples, the traversing order is determined based on 3D vertices corresponding to the first UV vertices in the first UV chart and can be used as the traversing order of the first UV vertices due to a consistency of the position connectivity with the UV connectivity within the first UV chart.

At (S950), from the coded information, prediction residuals of the first UV vertices are decoded based on the traversing order of the first UV vertices.

At (S960), first UV coordinates of the first UV vertices are determined according to UV coordinate predictions for the first UV vertices and the prediction residuals.

In an example, the first 3D index that indicates the first initial UV vertex is decoded from the coded information. Further, in an example, a face index of a first initial face that is incident to the first initial UV vertex in the UV space is decoded from the coded information.

In some examples, an 3D index offset for a second 3D vertex that corresponds to a second initial UV vertex in a second UV chart is decoded from the coded information, the second UV chart is coded subsequent to the first UV chart. Then, a second 3D index for the second 3D vertex that corresponds to the second initial UV vertex is determined according to the 3D index offset and a reference UV vertex from the first UV chart. For example, the second 3D vertex is a combination of the 3D index offset and a reference 3D index for a 3D vertex that corresponds to the reference UV vertex.

In some examples, to determine the first initial UV vertex, a set of 3D vertices that UV coordinates of corresponding UV vertices to the set of 3D vertices are not decoded can be determined. The set of 3D vertices can be searched to determine a first unvisited UV vertex in the UV space to be the first initial UV vertex, the first unvisited UV vertex corresponds to a 3D vertex in the set of 3D vertices with a smallest 3D index.

In some examples, to determine the first initial UV vertex, a set of 3D vertices that UV coordinates of corresponding UV vertices to the set of 3D vertices are not decoded can be determined. The set of 3D vertices can be searched to determine a plurality of unvisited UV vertices, the plurality of unvisited UV vertices correspond to a subset of 3D vertices in the set of 3D vertices with smallest 3D indices. The first initial UV vertex is determined from the plurality of unvisited UV vertices that has a minimum distance to a reference UV vertex.

In some examples, the set of 3D vertices that UV coordinates of corresponding UV vertices to the set of 3D vertices are not decoded is empty. In some examples, a first signal indicative of the first initial UV vertex among one or more unvisited seam UV vertex mates for a 3D seam vertex, and a second signal indicative of a reference UV vertex among one or more visited seam UV vertex mates for the 3D seam vertex can be decoded from the coded information of the mesh. Then, a UV coordinate of the first initial UV vertex can be predicted based on the reference UV vertex.

In some examples, a first UV coordinate of the first initial UV vertex is determined according to a first prediction based on a reference UV vertex. Then, a second UV coordinate of a second UV vertex that is subsequent of the first initial UV vertex in the traversing order is determined based on delta coding, the second UV vertex and the first initial UV vertex are in an initial UV face of the first UV chart. Further, in some examples, a third UV coordinate of a third UV vertex that is subsequent of the second UV vertex in the traversing order is determined based on a stretch prediction, the third UV vertex is a vertex in the initial UV face. Further, in an example, UV coordinates of one or more other vertices in the initial UV face can be determined according to a within-parallelogram prediction.

In some examples, a context for decoding a prediction residual for a UV vertex is selected based on a prediction of the UV vertex.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
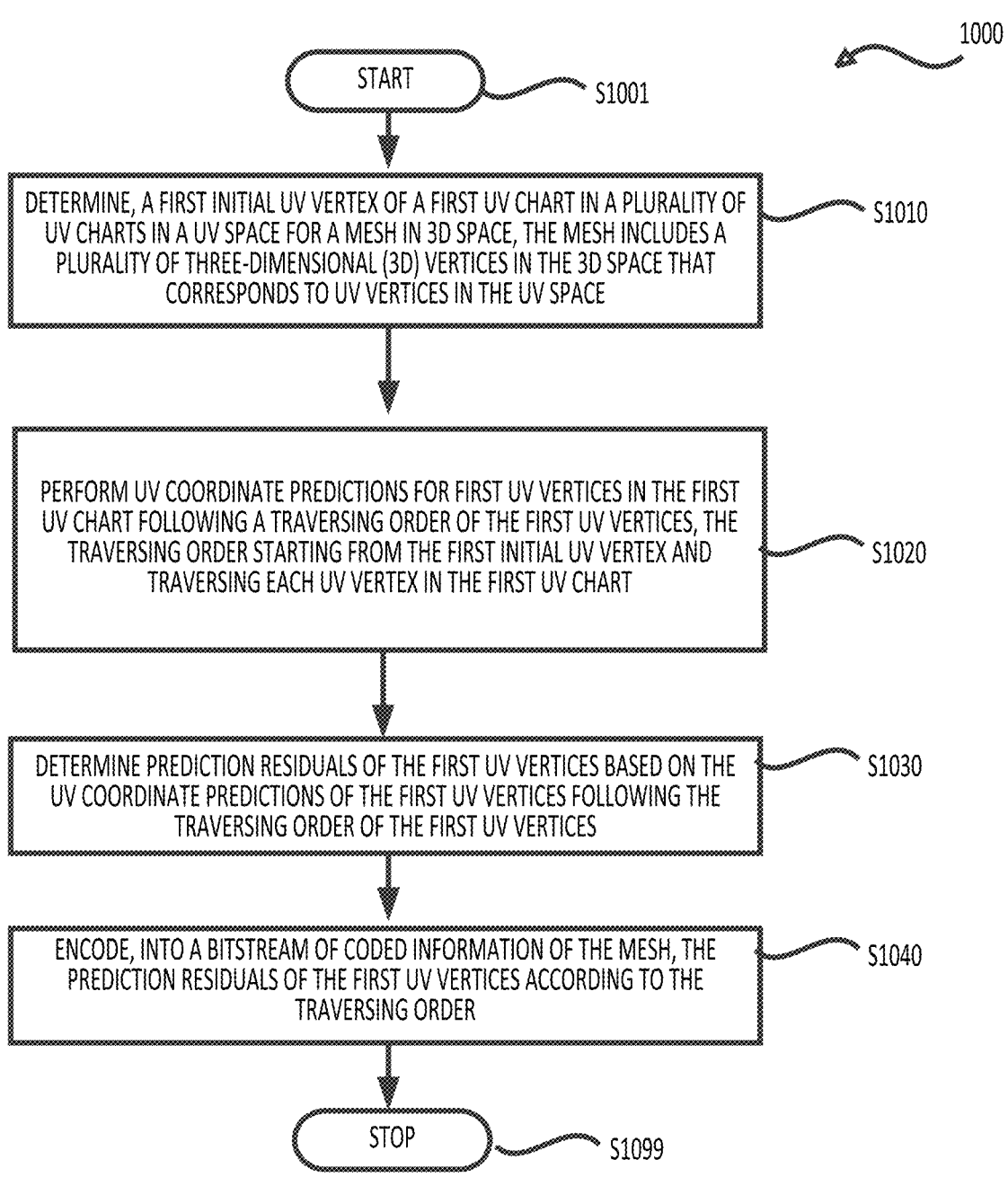
FIG. 10 shows a flow chart outlining an encoding process according to some aspects of the disclosure.

FIG. 10 shows a flow chart outlining a process (1000) according to an aspect of the disclosure. The process (1000) can be used in a mesh encoder. In various aspects, the process (1000) is executed by processing circuitry, such as the processing circuitry that performs functions of the 3D encoder (103), and the like. In some aspects, the process (1000) is implemented in software instructions, thus when the processing circuitry executes the software instructions, the processing circuitry performs the process (1000). The process starts at (S1001) and proceeds to (S1010).

At (S1010), a first initial UV vertex of a first UV chart in a plurality of UV charts in a UV space for a mesh in 3D space is determined. The mesh includes a plurality of three-dimensional (3D) vertices in the 3D space that corresponds to UV vertices in the UV space. In some examples, after an initial UV vertex in a UV chart is determined, a correspondence of 3D vertices and UV vertices in the UV chart is established, UV connectivity of the UV vertices in the UV chart is consistent with position connectivity. In some examples, the UV vertices in the chart can be traversed according to a suitable technique, such as traversing order of corresponding 3D vertices to the UV vertices in the chart.

At (S1020), UV coordinate predictions are performed for first UV vertices in the first UV chart following a traversing order of the first UV vertices, the traversing order starts from the first initial UV vertex and traverses each UV vertex in the first UV chart.

At (S1030), prediction residuals of the first UV vertices are determined based on the UV coordinate predictions of the first UV vertices following the traversing order of the first UV vertices.

At (S1040), the prediction residuals of the first UV vertices are encoding into a bitstream of coded information of the mesh according to the traversing order.

In some examples, a first signal indicative of a first 3D index of a 3D vertex that corresponds to the first initial UV vertex in the UV space is encoded into the bitstream of the coded information of the mesh. Further, in an example, a second signal indicative of a face index of a first initial face that is incident to the first initial UV vertex in the UV space is encoded into the bitstream of the coded information of the mesh.

In some examples, a closest UV vertex to a position in the UV space is selected as the first initial UV vertex. In some examples, a closest UV vertex to a reference UV vertex is selected as the first initial UV vertex, the reference UV vertex is a predefined vertex in a UV chart coded prior to the first UV chart, such as a first UV vertex, a last UV vertex and the like in the UV chart that is coded prior to the first UV chart.

In some examples, a plurality of UV vertices in the first UV chart that are closest UV vertices to a reference UV vertex are determined. The reference UV vertex is a predefined vertex in a UV chart coded prior to the first UV chart. The first initial UV vertex is selected from the plurality of UV vertices as the one that can achieve an optimal combined signaling cost for 3D index and UV coordinate.

In some examples, a set of 3D vertices that UV coordinates of corresponding UV vertices to the set of 3D vertices are not encoded can be determined. The set of 3D vertices are searched to determine a first unvisited UV vertex in the UV space to be the first initial UV vertex, the first unvisited UV vertex corresponds to a 3D vertex in the set of 3D vertices with a smallest 3D index.

In some examples, a set of 3D vertices that UV coordinates of corresponding UV vertices to the set of 3D vertices are not decoded can be determined. The set of 3D vertices are searched to determine a plurality of unvisited UV vertices, the plurality of unvisited UV vertices corresponds to a subset of 3D vertices in the set of 3D vertices with smallest 3D indices. A UV vertex that has a minimum distance to a reference UV vertex is selected from the plurality of unvisited UV vertices as the first initial UV vertex.

In some examples, all of the 3D vertices have at least a corresponding UV vertex being encoded, thus the set of 3D vertices having corresponding UV vertices not being encoded is empty, then the second type of initial vertices/faces can be used. In some examples, a pair of seam UV vertex mates that correspond to a 3D seam vertex is suitably selected. The pair of seam UV vertex mates includes a first seam UV vertex that is encoded, and a second seam UV vertex that is not encoded. The second seam UV vertex is determined as the first initial UV vertex, and a UV coordinate of the second seam UV vertex is predicted based on the first seam UV vertex.

In some examples, a first signal indicative of the first initial UV vertex among one or more unvisited seam UV vertex mates for the 3D seam vertex, and a second signal indicative of a reference UV vertex among one or more visited seam UV vertex mates for the 3D seam vertex are encoded into the bitstream of the coded information of the mesh.

In some examples, a first UV coordinate of the first initial UV vertex is encoded according to a first prediction based on a reference UV vertex, and a second UV coordinate of a second UV vertex is encoded based on delta coding. The second UV vertex is subsequent of the first initial UV vertex in the traversing order, the second UV vertex and the first initial UV vertex are in an initial UV face of the first UV chart. Further, in some examples, a third UV coordinate of a third UV vertex that is subsequent of the second UV vertex in the traversing order is encoded based on a stretch prediction, the third UV vertex is a vertex in the initial UV face. Further, in some examples, when the initial UV face have one or more other vertices, the one or more other vertices in the initial UV face are encoded according to a within-parallelogram prediction.

In some examples, a context for encoding a prediction residual for a UV vertex is selected based on a prediction of the UV vertex.

Then, the process proceeds to (S1099) and terminates.

The process (1000) can be suitably adapted. Step(s) in the process (1000) can be modified and/or omitted. Additional step(s) can be added. Any suitable order of implementation can be used.

According to an aspect of the disclosure, a method of processing mesh is provided. In the method, a conversion between a mesh file and a bitstream of compressed mesh is performed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a mesh, the coded information includes position connectivity of a plurality of three-dimensional (3D) vertices of a mesh in a 3D space, and a correspondence of the plurality of 3D vertices to UV vertices in a UV space for the mesh. The format rule specifies that UV connectivity of the UV vertices is determined from the coded information, the UV vertices is connected according to the UV connectivity to form a plurality of UV charts in the UV space. The format rule also specifies that a first initial UV vertex in a first UV chart in the plurality of UV charts is determined based on the coded information, the first initial UV vertex corresponding to a first 3D vertex having a first 3D index; first UV vertices in the first UV chart are determined according to a traversing order of 3D vertices corresponding to the first UV vertices in the first UV chart, the traversing order starting from the first initial UV vertex and traversing each UV vertex in the first UV chart; prediction residuals of the first UV vertices are decoded from the coded information based on the traversing order of the first UV vertices; and first UV coordinates of the first UV vertices are determined according to UV coordinate predictions for the first UV vertices and the prediction residuals.

The techniques described above, can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
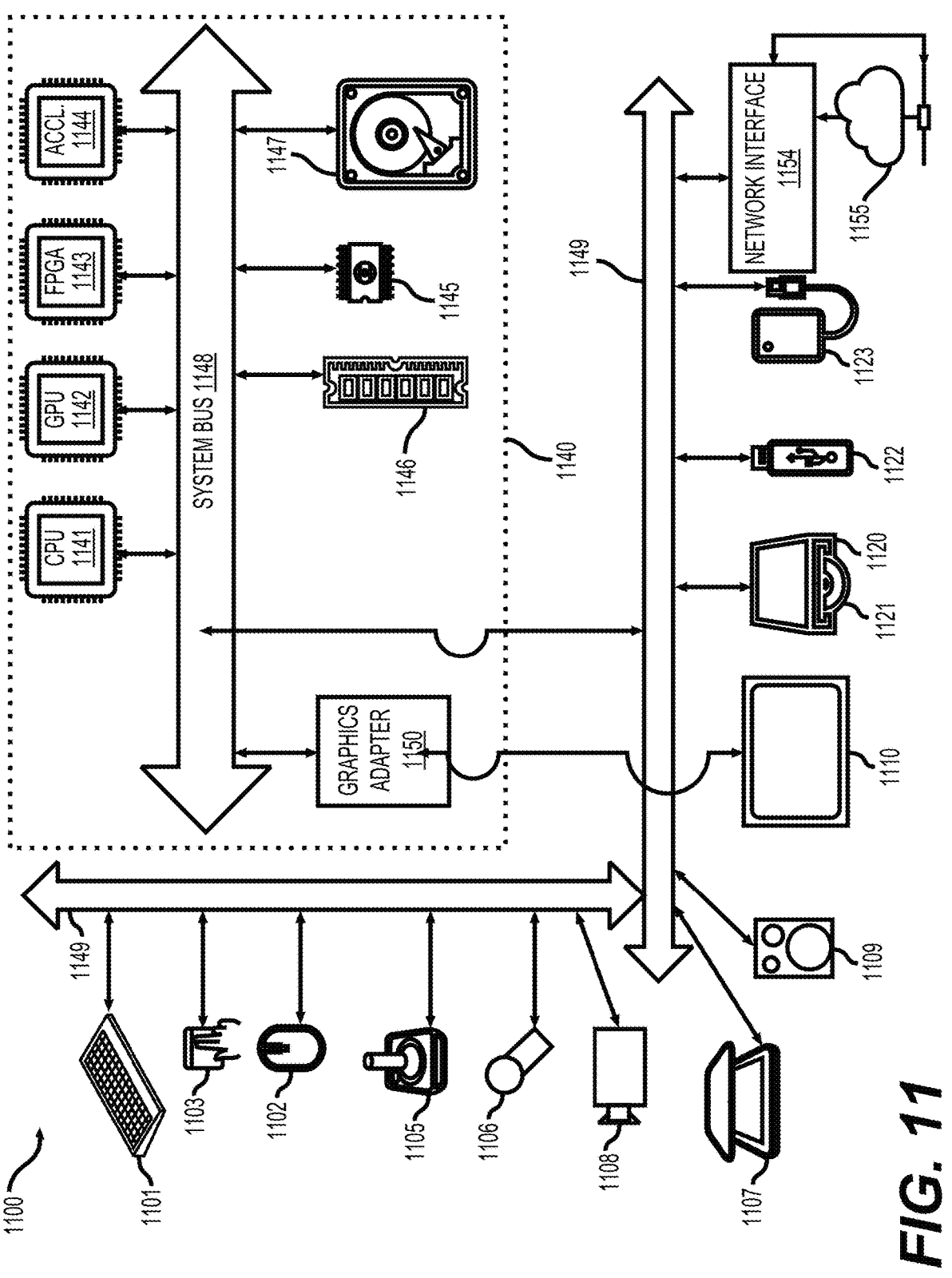
FIG. 11 is a schematic illustration of a computer system in accordance with an aspect.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of mesh processing, the method including: receiving coded information of a mesh, the coded information including position connectivity of a plurality of three-dimensional (3D) vertices of a mesh in a 3D space, and a correspondence of the plurality of 3D vertices to UV vertices in a UV space for the mesh; determining UV connectivity of the UV vertices from the coded information, the UV vertices being connected to form a plurality of UV charts in the UV space; determining, based on the coded information, a first initial UV vertex in a first UV chart in the plurality of UV charts, the first initial UV vertex corresponding to a first 3D vertex having a first 3D index; determining first UV vertices in the first UV chart according to a traversing order of 3D vertices corresponding to the first UV vertices in the first UV chart, the traversing order starting from the first initial UV vertex and traversing each UV vertex in the first UV chart; decoding, from the coded information, prediction residuals of the first UV vertices based on the traversing order of the first UV vertices; and determining first UV coordinates of the first UV vertices according to UV coordinate predictions for the first UV vertices and the prediction residuals.

(2) The method of feature (1), in which the determining the first initial UV vertex includes: decoding, from the coded information, the first 3D index; and decoding, from the coded information, a face index of a first initial face that is incident to the first initial UV vertex in the UV space.

(3) The method of any of features (1) to (2), the method including: decoding, from the coded information, an 3D index offset for a second 3D vertex that corresponds to a second initial UV vertex in a second UV chart, the second UV chart being coded subsequent to the first UV chart; and determining, a second 3D index for the second 3D vertex that corresponds to the second initial UV vertex according to the 3D index offset and a reference UV vertex from the first UV chart.

(4) The method of any of features (1) to (3), in which the determining the first initial UV vertex includes: determining, a set of 3D vertices that UV coordinates of corresponding UV vertices to the set of 3D vertices are not decoded; and searching the set of 3D vertices to determine a first unvisited UV vertex in the UV space to be the first initial UV vertex, the first unvisited UV vertex corresponding to a 3D vertex in the set of 3D vertices with a smallest 3D index.

(5) The method of any of features (1) to (4), in which the determining the first initial UV vertex includes: determining, a set of 3D vertices that UV coordinates of corresponding UV vertices to the set of 3D vertices are not decoded; searching the set of 3D vertices to determine a plurality of unvisited UV vertices, the plurality of unvisited UV vertices corresponding to a subset of 3D vertices in the set of 3D vertices with smallest 3D indices; and selecting the first initial UV vertex from the plurality of unvisited UV vertices that has a minimum distance to a reference UV vertex.

(6) The method of any of features (1) to (5), the method further including: determining that the set of 3D vertices is empty; decoding, from the coded information of the mesh, a first signal indicative of the first initial UV vertex among one or more unvisited seam UV vertex mates for a 3D seam vertex, and a second signal indicative of a reference UV vertex among one or more visited seam UV vertex mates for the 3D seam vertex; and determining a UV coordinate of the first initial UV vertex according to a prediction based on the reference UV vertex.

(7) The method of any of features (1) to (6), the method further including: determining a first UV coordinate of the first initial UV vertex according to a first prediction based on a reference UV vertex; and determining a second UV coordinate of a second UV vertex that is subsequent of the first initial UV vertex in the traversing order based on delta coding, the second UV vertex and the first initial UV vertex being in an initial UV face of the first UV chart.

(8) The method of any of features (1) to (7), the method further including: determining a third UV coordinate of a third UV vertex that is subsequent of the second UV vertex in the traversing order based on a stretch prediction, the third UV vertex being a vertex in the initial UV face.

(9) The method of any of features (1) to (8), the method further including: determining UV coordinates of one or more other vertices in the initial UV face according to a within-parallelogram prediction.

(10) The method of any of features (1) to (9), the method further including: selecting a context for decoding a prediction residual for a UV vertex based on a prediction of the UV vertex.

(11) A method of mesh processing, the method including: determining a first initial UV vertex of a first UV chart in a plurality of UV charts in a UV space for a mesh in three-dimensional (3D) space, the mesh including a plurality of 3D vertices in the 3D space that corresponds to UV vertices in the UV space; performing UV coordinate predictions for first UV vertices in the first UV chart following a traversing order of the first UV vertices, the traversing order starting from the first initial UV vertex and traversing each UV vertex in the first UV chart; determining prediction residuals of the first UV vertices based on the UV coordinate predictions of the first UV vertices following the traversing order of the first UV vertices; and encoding the prediction residuals of the first UV vertices into a bitstream of coded information of the mesh according to the traversing order.

(12) The method of feature (11), the method further including at least one of encoding a first signal indicative of a first 3D index of a 3D vertex that corresponds to the first initial UV vertex in the UV space into the bitstream of the coded information of the mesh; and/or encoding a second signal indicative of a face index of a first initial face that is incident to the first initial UV vertex in the UV space into the bitstream of the coded information of the mesh.

(13) The method of any of features (11) to (12), in which the determining the first initial UV vertex includes: selecting a closest UV vertex to a position in the UV space as the first initial UV vertex.

(14) The method of any of features (11) to (13), in which the determining the first initial UV vertex includes: selecting a closest UV vertex to a reference UV vertex as the first initial UV vertex, the reference UV vertex being a predefined vertex in a UV chart coded prior to the first UV chart.

(15) The method of any of features (11) to (14), in which the determining the first initial UV vertex includes: determining a plurality of UV vertices in the first UV chart that are closest UV vertices to a reference UV vertex; and selecting the first initial UV vertex from the plurality of UV vertices that achieves an optimal combined signaling cost for 3D index and UV coordinate.

(16) The method of any of features (11) to (15), in which the determining the first initial UV vertex includes: determining a set of 3D vertices that UV coordinates of corresponding UV vertices to the set of 3D vertices are not encoded; and searching the set of 3D vertices to select a first unvisited UV vertex in the UV space to be the first initial UV vertex, the first unvisited UV vertex corresponding to a 3D vertex in the set of 3D vertices with a smallest 3D index.

(17) The method of any of features (11) to (16), in which the determining the first initial UV vertex includes: determining a set of 3D vertices that UV coordinates of corresponding UV vertices to the set of 3D vertices are not encoded; searching the set of 3D vertices to determine a plurality of unvisited UV vertices, the plurality of unvisited UV vertices corresponding to a subset of 3D vertices in the set of 3D vertices with smallest 3D indices; and selecting, from the plurality of unvisited UV vertices, a UV vertex that has a minimum distance to a reference UV vertex as the first initial UV vertex.

(18) The method of any of features (11) to (17), in which the determining the first initial UV vertex includes: determining a pair of seam UV vertex mates that correspond to a 3D seam vertex, the 3D seam vertex being a 3D vertex corresponding to a plurality of UV vertices, the pair of seam UV vertex mates including a first UV vertex that is encoded, and a second UV vertex that is not encoded; and selecting the second UV vertex as the first initial UV vertex, a UV coordinate of the second UV vertex being predicted based on the first UV vertex.

(19) The method of any of features (11) to (18), the method further including: encoding, into the bitstream of the coded information of the mesh, a first signal indicative of the second UV vertex among a plurality of second UV vertices that correspond to the 3D seam vertex and are not encoded, and a second signal indicative of the first UV vertex among a plurality of first UV vertices that correspond to the 3D seam vertex and are encoded.

(20) A method of processing mesh data, the method including processing a bitstream of mesh data according to a format rule. The bitstream includes coded information of a mesh, the coded information including position connectivity of a plurality of three-dimensional (3D) vertices of a mesh in a 3D space, and a correspondence of the plurality of 3D vertices to UV vertices in a UV space for the mesh. The format rule specifies that: UV connectivity of the UV vertices is determined from the coded information, the UV vertices being connected according to the UV connectivity to form a plurality of UV charts in the UV space; a first initial UV vertex in a first UV chart in the plurality of UV charts is determined based on the coded information, the first initial UV vertex corresponding to a first 3D vertex having a first 3D index; first UV vertices in the first UV chart are determined according to a traversing order of 3D vertices corresponding to the first UV vertices in the first UV chart, the traversing order starting from the first initial UV vertex and traversing each UV vertex in the first UV chart; prediction residuals of the first UV vertices are decoded from the coded information based on the traversing order of the first UV vertices; and first UV coordinates of the first UV vertices are determined according to UV coordinate predictions for the first UV vertices and the prediction residuals.

(21) An apparatus for mesh processing, including processing circuitry that is configured to perform the method of any of features (1) to (10).

(22) An apparatus for mesh processing, including processing circuitry that is configured to perform the method of any of features (11) to (19).

(23) A non-transitory computer-readable storage medium storing instructions which when executed by at least one processor cause the at least one processor to perform the method of any of features (1) to (19).

What is claimed is:

1. A method of mesh processing, comprising:
receiving coded information of a mesh, the coded information including position connectivity of a plurality of three-dimensional (3D) vertices of the mesh in a 3D space, and a correspondence of the plurality of 3D vertices to UV vertices in a UV space for the mesh;
determining UV connectivity of the UV vertices from the coded information, the UV vertices being connected to form a plurality of UV charts in the UV space;
determining, based on the coded information, a first initial UV vertex in a first UV chart in the plurality of UV charts, the first initial UV vertex corresponding to a first 3D vertex having a first 3D index in the plurality of 3D vertices, the first initial UV vertex being determined from a plurality of unvisited UV vertices in the first UV chart according to the first 3D index of the first 3D vertex when the first initial UV vertex is to be determined based on the plurality of unvisited UV vertices;
determining first UV vertices in the first UV chart according to a traversing order of 3D vertices corresponding to the first UV vertices in the first UV chart, the traversing order starting from the first initial UV vertex and traversing each UV vertex in the first UV chart;
decoding, from the coded information, prediction residuals of the first UV vertices based on the traversing order of the first UV vertices; and
determining first UV coordinates of the first UV vertices according to UV coordinate predictions for the first UV vertices and the prediction residuals.

2. The method of claim 1, wherein the determining the first initial UV vertex comprises:
decoding, from the coded information, the first 3D index of the first 3D vertex corresponding to the first initial UV vertex; and
decoding, from the coded information, a face index of a first initial face that is incident to the first initial UV vertex in the UV space.

3. The method of claim 2, further comprising:
decoding, from the coded information, a 3D index offset for a second 3D vertex that corresponds to a second initial UV vertex in a second UV chart, the second UV chart being coded subsequent to the first UV chart; and
determining, a second 3D index for the second 3D vertex that corresponds to the second initial UV vertex according to the 3D index offset and a reference UV vertex from the first UV chart.

4. The method of claim 1, wherein the determining the first initial UV vertex comprises:
determining, a set of 3D vertices that UV coordinates of corresponding UV vertices to the set of 3D vertices are not decoded; and
searching the set of 3D vertices to determine a first unvisited UV vertex of the plurality of unvisited UV vertices in the UV space to be the first initial UV vertex, the first unvisited UV vertex corresponding to a 3D vertex in the set of 3D vertices with a smallest 3D index.

5. The method of claim 1, wherein the determining the first initial UV vertex comprises:
determining, a set of 3D vertices that UV coordinates of corresponding UV vertices to the set of 3D vertices are not decoded;
searching the set of 3D vertices to determine the plurality of unvisited UV vertices, the plurality of unvisited UV vertices corresponding to a subset of 3D vertices in the set of 3D vertices with smallest 3D indices; and
selecting the first initial UV vertex from the plurality of unvisited UV vertices that has a minimum distance to a reference UV vertex.

6. The method of claim 5, further comprising:
determining that the set of 3D vertices is empty;
decoding, from the coded information of the mesh, a first signal indicative of the first initial UV vertex among one or more unvisited seam UV vertex mates for a 3D seam vertex, and a second signal indicative of a reference UV vertex among one or more visited seam UV vertex mates for the 3D seam vertex; and
determining a UV coordinate of the first initial UV vertex according to a prediction based on the reference UV vertex.

7. The method of claim 1, further comprising:

determining a first UV coordinate of the first initial UV vertex according to a first prediction based on a reference UV vertex; and determining a second UV coordinate of a second UV vertex that is subsequent to the first initial UV vertex in the traversing order based on delta coding, the second UV vertex and the first initial UV vertex being in an initial UV face of the first UV chart.

8. The method of claim 7, further comprising:

determining a third UV coordinate of a third UV vertex that is subsequent to the second UV vertex in the traversing order based on a stretch prediction, the third UV vertex being a vertex in the initial UV face.

9. The method of claim 8, further comprising:

determining UV coordinates of one or more other vertices in the initial UV face according to a within-parallelogram prediction.

10. The method of claim 1, further comprising:

selecting a context for decoding a prediction residual for a UV vertex based on a prediction of the UV vertex.

11. A method of mesh processing, comprising:

determining a first initial UV vertex of a first UV chart in a plurality of UV charts in a UV space for a mesh in three-dimensional (3D) space, the mesh including a plurality of 3D vertices in the 3D space that corresponds to UV vertices in the UV space, the first initial UV vertex corresponding to a first 3D vertex of the plurality of 3D vertices, the first initial UV vertex being determined from a plurality of unvisited UV vertices in the first UV chart when the first initial UV vertex is to be determined based on the plurality of unvisited UV vertices;

performing UV coordinate predictions for first UV vertices in the first UV chart following a traversing order of the first UV vertices, the traversing order starting from the first initial UV vertex and traversing each UV vertex in the first UV chart;

determining prediction residuals of the first UV vertices based on the UV coordinate predictions of the first UV vertices following the traversing order of the first UV vertices;

encoding the prediction residuals of the first UV vertices into a bitstream of coded information of the mesh according to the traversing order; and encoding a first 3D index of the first 3D vertex into the bitstream of the coded information of the mesh, the first 3D index indicating the first initial UV vertex in the plurality of unvisited UV vertices.

12. The method of claim 11, further comprising at least one of:

encoding a face index of a first initial face that is incident to the first initial UV vertex in the UV space into the bitstream of the coded information of the mesh.

13. The method of claim 11, wherein the determining the first initial UV vertex comprises:

selecting a closest UV vertex to a position in the UV space as the first initial UV vertex.

14. The method of claim 11, wherein the determining the first initial UV vertex comprises:

selecting a closest UV vertex to a reference UV vertex as the first initial UV vertex, the reference UV vertex being a predefined vertex in a UV chart coded prior to the first UV chart.

15. The method of claim 11, wherein the determining the first initial UV vertex comprises:

determining a plurality of UV vertices in the first UV chart that are closest UV vertices to a reference UV vertex; and selecting the first initial UV vertex from the plurality of UV vertices that achieves an optimal combined signaling cost for 3D index and UV coordinate.

16. The method of claim 11, wherein the determining the first initial UV vertex comprises:

determining a set of 3D vertices that UV coordinates of corresponding UV vertices to the set of 3D vertices are not encoded; and searching the set of 3D vertices to select a first unvisited UV vertex of the plurality of unvisited UV vertices in the UV space to be the first initial UV vertex, the first unvisited UV vertex corresponding to a 3D vertex in the set of 3D vertices with a smallest 3D index.

17. The method of claim 11, wherein the determining the first initial UV vertex comprises:

determining a set of 3D vertices that UV coordinates of corresponding UV vertices to the set of 3D vertices are not encoded;

searching the set of 3D vertices to determine the plurality of unvisited UV vertices, the plurality of unvisited UV vertices corresponding to a subset of 3D vertices in the set of 3D vertices with smallest 3D indices; and selecting, from the plurality of unvisited UV vertices, a UV vertex that has a minimum distance to a reference UV vertex as the first initial UV vertex.

18. The method of claim 11, wherein the determining the first initial UV vertex comprises:

determining a pair of seam UV vertex mates that correspond to a 3D seam vertex, the 3D seam vertex being a 3D vertex corresponding to a plurality of UV vertices, the pair of seam UV vertex mates including a first UV vertex that is encoded, and a second UV vertex that is not encoded; and selecting the second UV vertex as the first initial UV vertex, a UV coordinate of the second UV vertex being predicted based on the first UV vertex.

19. The method of claim 18, further comprising:

encoding, into the bitstream of the coded information of the mesh, a first signal indicative of the second UV vertex among a plurality of second UV vertices that correspond to the 3D seam vertex and are not encoded, and a second signal indicative of the first UV vertex among a plurality of first UV vertices that correspond to the 3D seam vertex and are encoded.

20. A non-transitory computer-readable storage medium storing instructions which, when executed by a processor, cause the processor to perform an encoding method comprising:

determining a first initial UV vertex of a first UV chart in a plurality of UV charts in a UV space for a mesh in three-dimensional (3D) space, the mesh including a plurality of 3D vertices in the 3D space that corresponds to UV vertices in the UV space, the first initial UV vertex corresponding to a first 3D vertex of the plurality of 3D vertices, the first initial UV vertex being determined from a plurality of unvisited UV vertices in the first UV chart when the first initial UV vertex is to be determined based on the plurality of unvisited UV vertices;

performing UV coordinate predictions for first UV vertices in the first UV chart following a traversing order of the first UV vertices, the traversing order starting from the first UV vertices, the traversing order starting from the first initial UV vertex and traversing each UV vertex in the first UV chart;

determining prediction residuals of the first UV vertices based on the UV coordinate predictions of the first UV vertices following the traversing order of the first UV vertices;

encoding the prediction residuals of the first UV vertices into a bitstream of coded information of the mesh according to the traversing order;

encoding a first 3D index of the first 3D vertex into the bitstream of the coded information of the mesh, the first 3D index indicating the first initial UV vertex in the plurality of unvisited UV vertices; and transmitting the encoded bitstream of the coded information of the mesh.

\* \* \* \* \*